(12) United States Patent
Merlin et al.

(10) Patent No.: US 9,220,023 B2
(45) Date of Patent: Dec. 22, 2015

(54) METHODS FOR SIGNALING A MAXIMUM NUMBER OF MSDUS IN A TRANSMISSION

(71) Applicant: QUALCOMM Incorporated, San Diego, CA (US)

(72) Inventors: Simone Merlin, San Diego, CA (US); Guido Robert Frederiks, Aptos, CA (US); Maarten Menzo Wentink, Naarden (NE); Vincent Knowles Jones, IV, Redwood City, CA (US); Ashish Kumar Shukla, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 13/918,170

(22) Filed: Jun. 14, 2013

(65) Prior Publication Data

US 2013/0343275 A1 Dec. 26, 2013

Related U.S. Application Data

(60) Provisional application No. 61/662,308, filed on Jun. 20, 2012, provisional application No. 61/778,102, filed on Mar. 12, 2013.

(51) Int. Cl.
*H04L 25/49* (2006.01)
*H04W 24/02* (2009.01)
*H04L 1/00* (2006.01)

(52) U.S. Cl.
CPC ............. *H04W 24/02* (2013.01); *H04L 1/0007* (2013.01)

(58) Field of Classification Search
CPC .................... H04W 24/02; H04L 1/0007
See application file for complete search history.

(56) References Cited

U.S. PATENT DOCUMENTS

| 7,630,403 | B2 | 12/2009 | Ho et al. |
| 8,238,835 | B2 | 8/2012 | Nagai et al. |
| 8,665,906 | B1 * | 3/2014 | Liu et al. ........................ 370/473 |

(Continued)

FOREIGN PATENT DOCUMENTS

| EP | 2475143 A1 | 7/2012 | |
| JP | WO2011027726 A1 * | 3/2011 | .............. H04L 29/06 |
| WO | 2011027726 A1 | 3/2011 | |

OTHER PUBLICATIONS

EWC, "HT MAC Specification", Enhanced Wireless Consortium Publication Version, V1.24 pp. 1-100, 2006.

(Continued)

*Primary Examiner* — Jay P Patel
(74) *Attorney, Agent, or Firm* — Holland & Hart LLP (57) ABSTRACT

A first wireless station provides a configuration indication value that specifies a maximum number of medium access control layer service data units (MSDUs) that may be included in each medium access control layer protocol data unit (MPDU), or in each aggregated MPDU (A-MPDU), received by the first wireless station. A second wireless station receives the configuration indication value from the first wireless station, and in response, transmits only MSDUs (or A-MSDUs) having no more than the specified maximum number of MSDUs to the first wireless station. The configuration indication value can be included in various elements transmitted between the first and second wireless stations, including for example, a high throughput (HT) capabilities element, a very high throughput (VHT) capabilities information field, a VHT operation element or an add block acknowledge (ADDBA) response frame.

91 Claims, 8 Drawing Sheets

OF MSDUs IN AN MPDU (OR A-MSDU) LIMITED TO NO MORE THAN 16

(56) References Cited

U.S. PATENT DOCUMENTS

| | | |
|---|---|---|
| 2003/0081628 A1* | 5/2003 | Sugar et al. .................. 370/461 |
| 2011/0206066 A1 | 8/2011 | Hong et al. |
| 2012/0155518 A1* | 6/2012 | Nakamura et al. ............ 375/219 |
| 2012/0201196 A1 | 8/2012 | Merlin et al. |
| 2012/0314696 A1* | 12/2012 | Liu ............................... 370/338 |
| 2014/0032798 A1* | 1/2014 | Trainin ........................... 710/56 |

OTHER PUBLICATIONS

International Search Report and Written Opinion—PCT/US2013/046192—ISA/EPO—Sep. 13, 2013.

Merlin, et al., "Max Number of MSDUs in an A-MSDU", IEEE P802.11 Wireless LANs, Mar. 8, 2012, pp. 4.

\* cited by examiner

| BITS | B0 B1 | B2 B3 | B4 | B5 | B6 | B7 | B8 B10 | B11 | B12 | B13 B15 |
|---|---|---|---|---|---|---|---|---|---|---|
| | MAX MPDU LENGTH 701 | SUPPORTED CHANNEL WIDTH SET 702 | RX LDPC 703 | SHORT GI FOR 80 MHZ 704 | SHORT GI FOR 160 AND 80+80 MHZ 705 | TX STBC 706 | RX STBC 707 | SU BEAM-FORMER CAPABLE 708 | SU BEAM-FORMEE CAPABLE 709 | COMPRESSED STEERING NUMBER OF BEAMFORMER ANTENNAS SUPPORTED 710 |
| | 2 | 2 | 1 | 1 | 1 | 1 | 3 | 1 | 1 | 3 |

700

| BITS | B16 B18 | B19 | B20 | B21 | B22 | B23 B25 | B26 B27 | B28 | B29 | B30 B31 |
|---|---|---|---|---|---|---|---|---|---|---|
| | NUMBER OF SOUNDING DIMENSIONS 711 | MU BEAM-FORMER CAPABLE 712 | MU BEAM-FORMEE CAPABLE 713 | VHT TXOP PS 714 | +HTC-VHT CAPABLE 715 | MAX A-MPDU LENGTH EXPONENT 716 | VHT LINK ADAPTION CAPABLE 717 | RX ANTENNA PATTERN CONSISTENCY 718 | TX ANTENNA PATTERN CONSISTENCY 719 | RESERVED 420 / CI 230 |
| | 3 | 1 | 1 | 1 | 1 | 3 | 2 | 1 | 1 | 2 |

METHODS FOR SIGNALING A MAXIMUM NUMBER OF MSDUS IN A TRANSMISSION

RELATED APPLICATIONS

This application claims priority under 35 U.S.C. §119(e) to U.S. Provisional Application Ser. No. 61/662,308, entitled "Methods For Signaling A Maximum Number of MSDUs In A Transmission", filed on Jun. 20, 2012, and U.S. Provisional Application Ser. No. 61/778,102, also entitled "Methods For Signaling A Maximum Number of MSDUs In A Transmission", filed Mar. 12, 2013, which are herein incorporated by reference in their entirety.

FIELD OF THE INVENTION

The disclosure relates to a wireless communication system, and more particularly, to methods and structures that allow the complexity of a wireless receiver to be reduced by limiting a number of data units allowed to be included in an aggregated data unit received by the wireless receiver.

RELATED ART

The IEEE 802.11 specification defines the concept of an aggregated MAC layer service data unit (A-MSDU), which may be included in a physical layer protocol data unit (PPDU). An A-MSDU includes a sequence of MAC layer service data units (MSDUs), which are included within the same MAC layer protocol data unit (MPDU). MPDUs can further be aggregated in aggregated MPDUs (A-MPDUs). The IEEE 802.11 specification defines the maximum length of an A-MSDU, the maximum length of an MPDU and the maximum number of MPDUs in an A-MPDU (wherein these values are derived from acknowledgment limitations).

Figure 1:
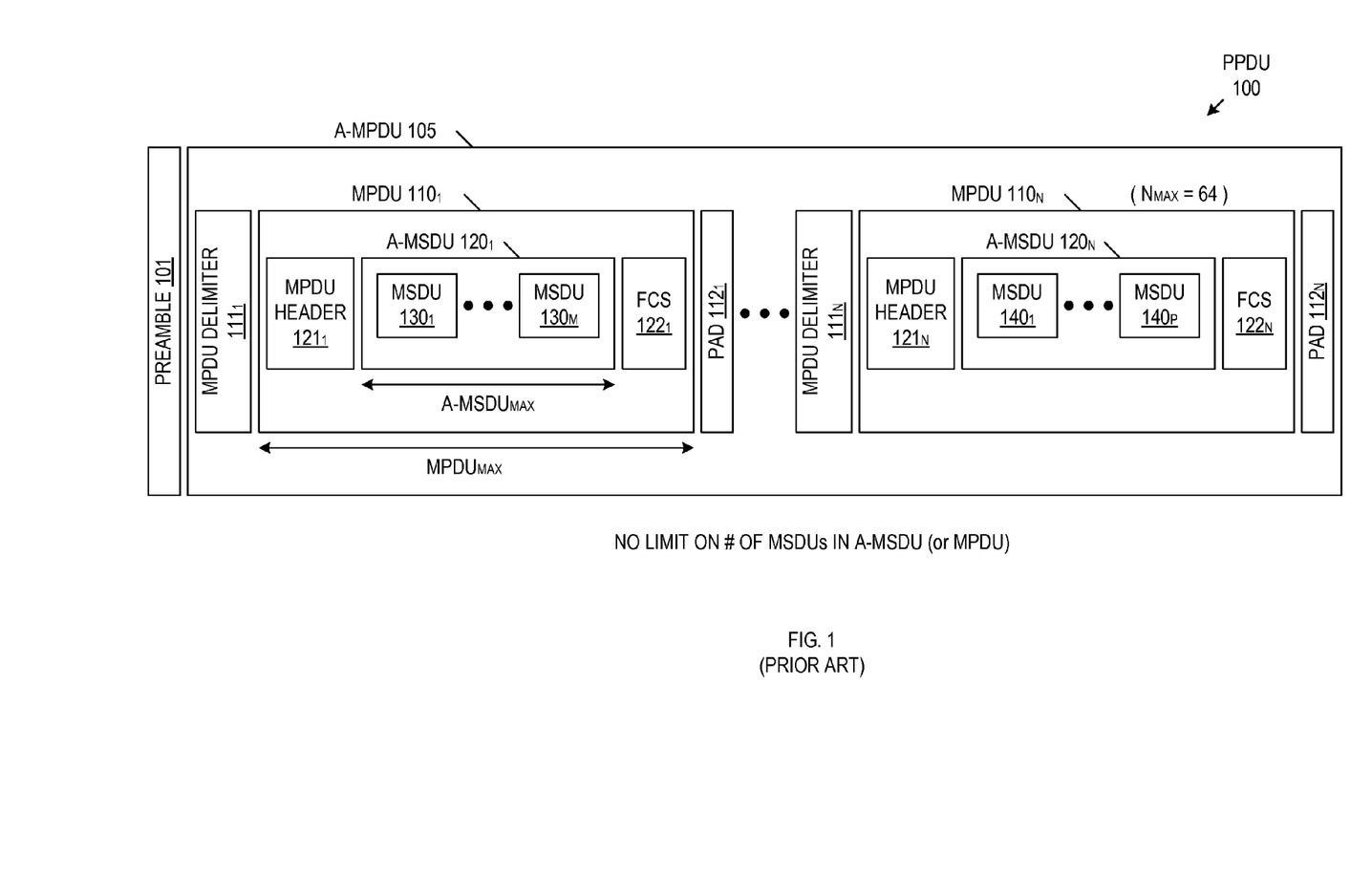
FIG. 1 is a block diagram of a conventional physical layer protocol data unit (PPDU) that includes an aggregated MAC layer protocol data unit (A-MPDU).

FIG. 1 is a block diagram that illustrates the general format of a conventional PPDU 100 that includes a preamble 101 and an A-MPDU 105. A-MPDU 105 includes a plurality of MPDUs $110_1$-$110_N$, each having a corresponding MPDU delimiter $111_1$-$111_N$, respectively, and corresponding padding $112_1$-$112_N$, respectively. The maximum number of MPDUs in A-MPDU 105 is defined by the IEEE 802.11 specification, wherein there are a maximum of N=64 MPDUs allowed in A-MPDU 105. The maximum length of each MPDU $110_1$-$110_N$ (i.e., $MPDU_{MAX}$) may also be defined in accordance with the IEEE 802.11 specification. For example, the maximum MPDU length $MPDU_{MAX}$ may be defined to have a value of 11,454 bytes.

As illustrated by FIG. 1, each MPDU $110_1$-$110_N$ may include an A-MSDU, which includes multiple MSDUs. For example, MPDU $110_1$ includes A-MSDU $120_1$, which includes a plurality of MSDUs $130_1$-$130_M$. Similarly, MPDU $110_N$ includes A-MSDU $120_N$, which includes a plurality of MSDUs $140_1$-$140_P$. The maximum length of each A-MSDU $120_1$-$120_N$ (i.e., $A\text{-}MSDU_{MAX}$) is also defined in accordance with the IEEE 802.11 specification.

It is important to note that the IEEE 802.11 specification does not place a limit on the number of MSDUs that can be packed in an A-MSDU (or MPDU). That is, there is no limit on the number (M) of MSDUs in A-MSDU $120_1$, or the number (P) of MSDUs in A-MSDU $120_N$. Potentially, the number of MSDUs included in an A-MSDU can be very large (e.g., hundreds). Considering that up to 64 MPDUs can be aggregated in an A-MPDU, A-MPDU 105 could end up including thousands of MSDUs. Processing a high and unpredictable number of MSDUs undesirably increases the complexity of a receiver circuit that must process A-MPDU 105.

As illustrated by FIG. 1, MPDUs $110_1$-$110_N$ also include MPDU headers $121_1$-$121_N$, respectively, and frame correction sequence (FCS) fields $122_1$-$122_N$, respectively. Each FCS field $122_1$-$122_N$ is provided at the end of the corresponding MPDU $110_1$-$110_N$, and is used to determine the correctness of the MSDUs in the corresponding MPDUs $110_1$-$110_N$. For example, FCS field $122_1$ is used to determine the correctness of all of the MSDUs $130_1$-$130_M$ included in MPDU $110_1$. Because the FCS field $122_1$ is included at the end of MPDU $110_1$, a large number of MSDUs may be processed (uselessly) by the time an error is eventually detected in response to the later-received FCS field $122_1$.

It would therefore be desirable to have a method and apparatus for mitigating the above-described problems.

SUMMARY

Accordingly, embodiments of the present disclosure provide a first wireless station that provides a configuration indication that specifies a maximum number of medium access control layer service data units (MSDUs) that may be included in each medium access control layer protocol data unit (MPDU), or alternately, in each aggregated MPDU (A-MPDU), received by the first wireless station. For example, the configuration indication may specify that each MPDU may include no more than 16 MSDUs. Alternately, the configuration indication may specify that each A-MPDU may include no more than 16*64 MSDUs.

A second wireless station receives the configuration indication from the first wireless station, and in response, transmits only MPDUs (or A-MPDUs) having no more than the specified maximum number of MSDUs to the first wireless station. Because the first wireless station will only receive MPDUs (or A-MPDUs) having a limited number of MSDUs, the design complexity of the receiver in the first wireless station is reduced. Moreover, the risk of processing a large number of MSDUs, and subsequently determining that these MSDUs contain an error (in response to the corresponding FCS field) is eliminated.

In one embodiment, the configuration indication can be included in various elements transmitted between the first and second wireless stations, including for example, a high throughput (HT) capabilities element, a very high throughput (VHT) capabilities information field, a VHT operation element, or an add block acknowledge (ADDBA) response frame.

In accordance with one embodiment, the maximum number of MSDUs is determined in response to both the configuration indication and one or more known parameters that define communications between the first and second wireless stations. For example, the maximum number of MSDUs may be determined in response to the configuration indication and a known maximum allowed MPDU length and/or a known maximum allowed A-MSDU length. In accordance with another embodiment, the maximum number of MSDUs is determined in response to the type of frame in which the MSDUs are carried (e.g., high-throughput (HT) PPDU, very high throughput (VHT) PPDU, or non-HT PPDU).

The disclosure will be more fully understood in view of the following description and drawings.

DETAILED DESCRIPTION

Figure 2:
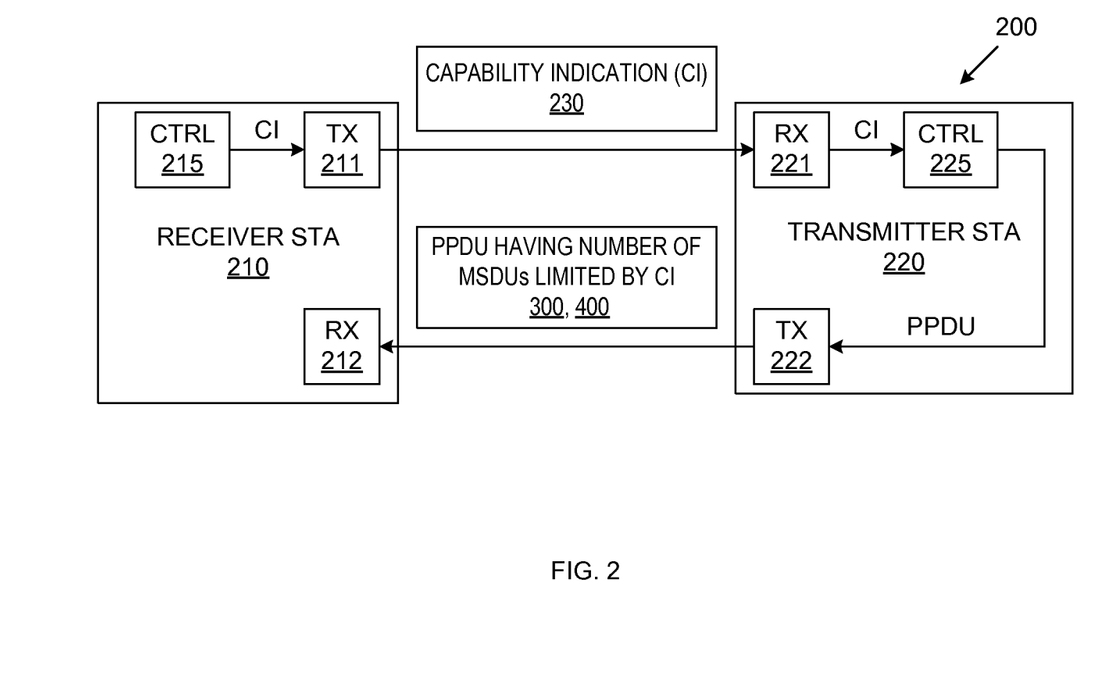
FIG. 2 is a block diagram illustrating a wireless communication system in accordance with one embodiment, wherein a capability indication enables limitation of the number of MAC layer service data units (MSDUs) per aggregated MSDU (A-MSDU) or per A-MPDU.

FIG. 2 is a block diagram illustrating a wireless communication system 200 in accordance with one embodiment of the disclosure. Wireless communication system 200 includes a receiver station (STA) 210 and a transmitter station (STA) 220, wherein the transmitter STA 220 transmits PPDUs including MPDUs and/or A-MPDUs to receiver STA 210. In the described embodiments, receiver STA 210 and transmitter STA 220 are very high throughput (VHT) stations in accordance with the IEEE 802.11 standard. In one embodiment, transmitter STA 220 is a wireless access point (AP), although this is not necessary. In general, receiver STA 210 includes wireless transmitter circuit 211, wireless receiver circuit 212 and control circuit 215. Similarly, transmitter STA 215 includes wireless receiver circuit 211, wireless transmitter circuit 222 and control circuit 225.

In accordance with a first embodiment, the control circuit 215 (or software) within receiver STA 210 provides a capability indication (CI) 230 to the transmitter circuit 211, wherein the transmitter circuit 211 transmits the capability indication CI 230 to transmitter STA 220. The capability indication CI 230 specifies whether the number of MSDUs included in an MPDU shall be less or equal to than a predetermined number (e.g., 16), or whether the number of MSDUs included in a MPDU shall not be limited (as in the conventional PPDU 100 of FIG. 1). Various manners in which the capability indication CI 230 may be transmitted from the receiver STA 210 are described in more detail below.

The receiver circuit 221 within transmitter STA 220 receives the capability indication CI 230 transmitted from the receiver STA 210, and provides this capability indication CI 230 to the control circuit 225 (or software) within transmitter STA 220. In response, if the received capability indication CI 230 specifies that the number of MSDUs included in each MPDU transmitted to the receiver STA 210 shall be less than or equal to a predetermined number, then control circuit 225 limits the number of MSDUs included in each MPDU transmitted from the transmitter STA 220 to the receiver STA 210 to no more than the predetermined number. For example, transmitter STA 220 may transmit a PPDU 300 from the transmitter circuit 222 to the receiver STA 210, wherein the control circuit 225 limits the number of MSDUs included in each MPDU of the PPDU 300 to no more than 16 MSDUs.

Figure 3:
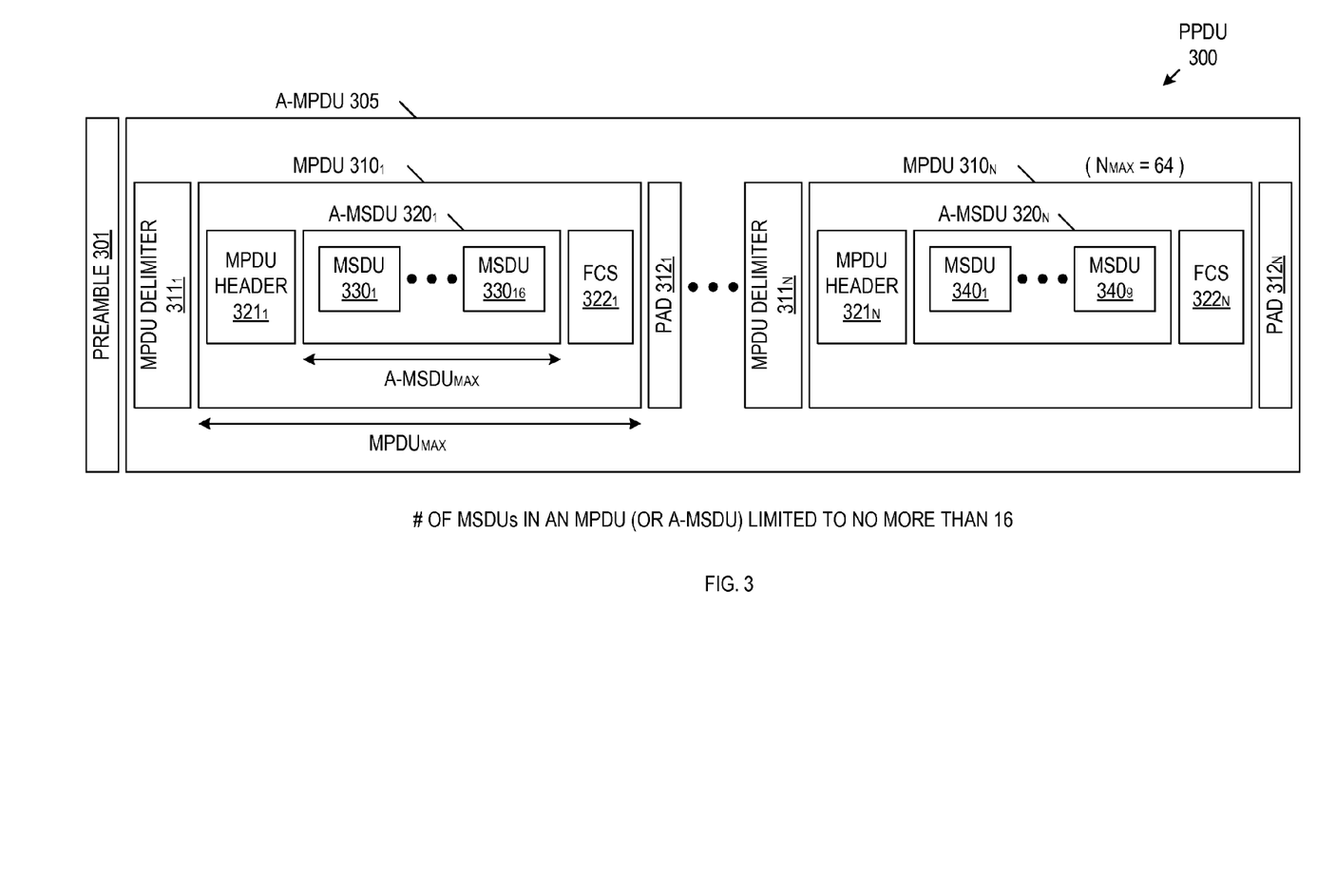
FIG. 3 is a block diagram of an exemplary physical layer protocol data unit (PPDU) having a limited number of MSDUs per MAC layer protocol data unit (MPDU) in accordance with a first embodiment.

FIG. 3 is a block diagram of an exemplary PPDU 300 in accordance with the first embodiment of the disclosure, wherein PPDU 300 includes preamble 301 and A-MPDU 305, and wherein A-MPDU 305 includes MPDU delimiters $311_1$-$311_N$, MPDUs $310_1$-$310_N$ and padding $312_1$-$312_N$. The MPDUs $310_1$-$310_N$ include MPDU headers $321_1$-$321_N$, respectively, A-MSDUs $320_1$-$320_N$, respectively, and FCS fields $322_1$-$322_N$, respectively. In accordance with the present embodiment, each of the MPDUs $310_1$-$310_N$ (and therefore, each of the A-MSDUs $320_1$-$320_N$), includes 16 or fewer MSDUs. In the illustrated example, MPDU $310_1$ (and A-MSDU $320_1$) includes 16 MSDUs $330_1$-$330_{16}$, and MPDU $310_N$ (and A-MSDU $320_N$) includes 9 MSDUs $340_1$-$340_9$. Because each of the MPDUs (and A-MSDUs) is limited to include no more than 16 MSDUs, the total number of MSDUs included in A-MPDU 305 is advantageously limited to a known (and manageable) number (e.g., 16*64). As a result, the design complexity of the receiver circuit 112 is advantageously reduced. Moreover, because each of the MPDUs $310_1$-$310_N$ is limited to include no more than 16 MSDUs, the associated FCS fields $322_1$-$322_N$ are only required to provide correction capabilities for a known (and manageable number) of MSDUs, thereby avoiding the situation where a large number (e.g., greater than 16) of MSDUs are processed before determining (with the FCS field) that a non-correctable error exists within the MSDUs.

In one variation of the first embodiment, the capability indication CI specifies that the number of MSDUs included in an MPDU shall be limited to a number specified by a field included in the capability indication CI. For example, the capability indication CI may alternately specify that that the number of MSDUs included in an MPDU shall be limited to a first predetermined number (e.g., 16), a second predetermined number (e.g., 8), a third predetermined number (e.g., 4), or not limited to any number (e.g., like the PPDU 100 of FIG. 1).

In accordance with a second embodiment, the receiver STA 210 transmits a capability indication CI to transmitter STA 220, wherein the capability indication CI 230 specifies that the total number of MSDUs included in all of the MPDUs of an A-MPDU shall be less than or equal to a predetermined number. For example, the capability indication CI 230 may indicate that the number of MSDUs included in an A-MPDU is limited to maximum of 1024 (i.e., 16*64). In this case, an A-MPDU that includes the maximum number of MPDUs (i.e., $N_{MAX}$=64) would be limited to an average of 16 MSDUs per MPDU.

Figure 4:
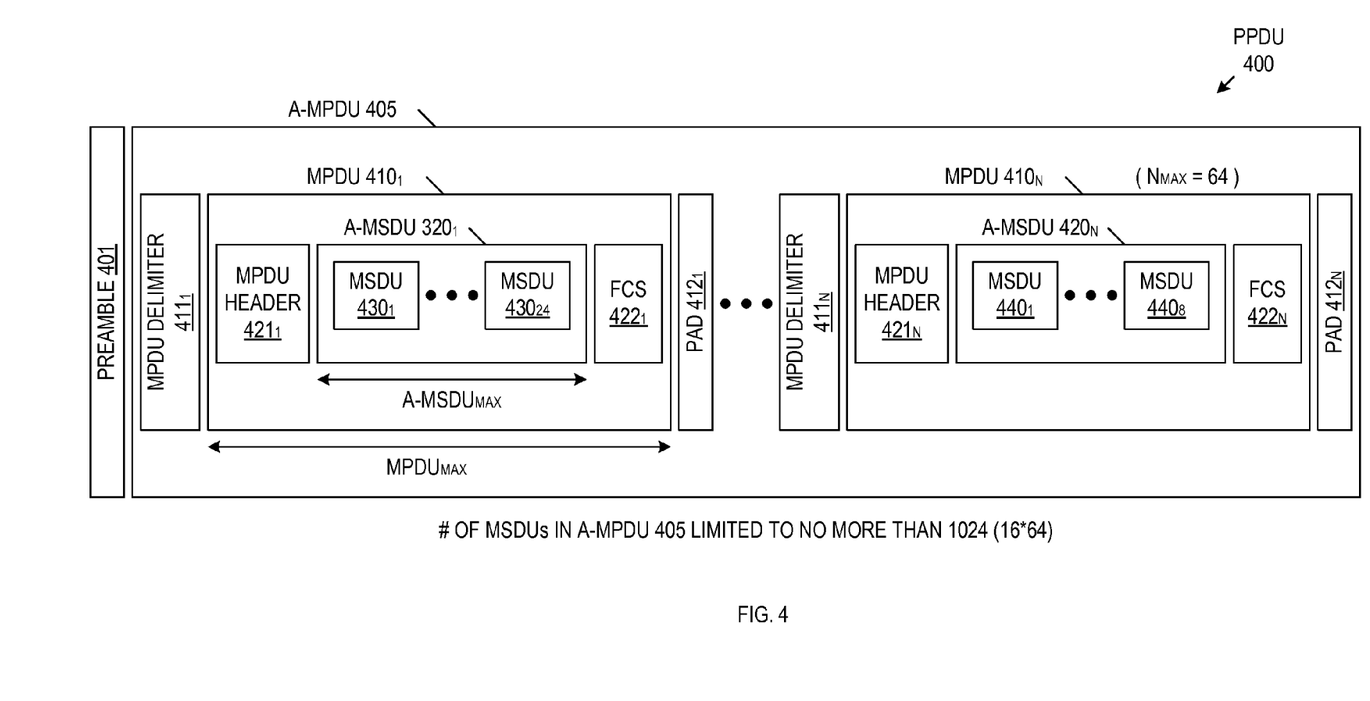
FIG. 4 is a block diagram of an exemplary PPDU having a limited number of MSDUs per A-MPDU in accordance with a second embodiment.

FIG. 4 is a block diagram of an exemplary PPDU 400 that may be transmitted from the transmitter STA 220 to the receiver STA 210 in accordance with the second embodiment of the disclosure. PPDU 400 includes preamble 401 and A-MPDU 405, and wherein A-MPDU 405 includes MPDU delimiters $411_1$-$411_N$, MPDUs $410_1$-$410_N$ and padding $412_1$-$412_N$. The MPDUs $410_1$-$410_N$ include MPDU headers $421_1$-$421_N$, respectively, A-MSDUs $420_1$-$420_N$, respectively, and FCS fields $422_1$-$422_N$, respectively. In accordance with the present embodiment, the control circuit 225 within the transmitter STA 220 causes the A-MPDU 405 to include 1024

(16*64) or fewer MSDUs. In the illustrated example, A-MSDU $420_1$ includes 24 MSDUs $430_1$-$430_{24}$, and A-MSDU $420_N$ includes 8 MSDUs $440_1$-$440_8$. If A-MPDU 405 includes the maximum number of 64 MPDUs $410_1$-$410_{64}$ (N=64), then on average, there are no more than 16 MSDUs per MPDU. In the above described manner, the total number of MSDUs included in A-MPDU 405 is advantageously limited to a known (and manageable number) (e.g., 16*64=1024). Moreover, on average, the FCS fields $322_1$-$322_N$ only provide correction capabilities for a manageable number of MSDUs. Note that the second embodiment provides greater flexibility in the number of MSDUs that may be included in any given MPDU, but provides less certainty in the number of MSDUs that are included in any given MPDU.

In one variation of the second embodiment, the capability indication CI 230 specifies that the number of MSDUs included in an A-MPDU shall be limited to a number specified by a field included in the capability indication CI 230. For example, the capability indication CI 230 may alternately specify that that the number of MSDUs included in an A-MPDU shall be limited to a first predetermined number (e.g., 16*64), a second predetermined number (e.g., 8*64), a third predetermined number (e.g., 4*64), or not limited to any number (e.g., like the PPDU 100 of FIG. 1).

The receiver STA 210 can indicate the maximum number of MSDUs (either per MPDU or per A-MPDU) using one or more bits that form capability indication CI 230. For example, in the first embodiment, if a 1-bit capability indication CI 230 is used, then a logic value of '0' may indicate no limit on the number of MSDUs per MPDU, and a logic value of '1' may indicate a maximum of 16 MSDUs per MPDU. If a 2-bit capability indication CI 230 is used, then a logic value of '00' may indicate no limit on the number of MSDUs per MPDU; a logic value of '01' may indicate a maximum of 16 MSDUs per MPDU; a logic value of '10' may indicate a maximum of 8 MSDUs per MPDU; and a logic value of '11' may indicate a maximum of 4 MSDUs per MPDU.

Similar indications can be provided for the number of MSDUs allowed in an A-MPDU. For example, in the second embodiment, if a 1-bit capability indication CI 230 is used, then a logic value of '0' may indicate no limit on the number of MSDUs per A-MPDU, and logic value of '1' may indicate a maximum of 16*64 MSDUs per A-MPDU. If a 2-bit capability indication CI 230 is used, then a logic value of '00' may indicate no limit on the number of MSDUs per A-MPDU; a logic value of '01' may indicate a maximum of 16*64 MSDUs per A-MPDU; a logic value of '10' may indicate a maximum of 8*64 MSDUs per A-MPDU; and a logic value of '11' may indicate a maximum of 4*64 MSDUs per A-MPDU.

In an alternate embodiment, the receiver STA 210 can provide a capability indication CI 230 that includes an indicator value, which is used in combination with one or more other parameters known to the receiver STA 210 and the transmitter STA 220, to determine a maximum number of MSDUs per MPDU (in the first embodiment), or a maximum number of MSDUs per A-MPDU (in the second embodiment). For example, if a 1-bit indicator value is used, then a logic value of '0' may indicate no limit on the number of MSDUs, and a logic value of '1' may indicate that the maximum number of MSDUs is determined in response to a known maximum MPDU length parameter and a known maximum A-MSDU length parameter (wherein these parameters are typically dependent on one other). Note that the maximum A-MSDU length parameter is provided in a "HT capabilities element", which is transmitted between the receiver STA 210 and the transmitter STA 220 in accordance with the IEEE 802.11 specification. Such an HT capabilities element is shown in more detail below in connection with FIG. 6. Similarly, the maximum MPDU length parameter is provided in a "VHT capabilities information field", which is transmitted between the receiver STA 210 and the transmitter STA 220 in accordance with the IEEE 802.11 specification. Such a VHT capabilities information field is shown in more detail below in connection with FIG. 7.

Figure 5:
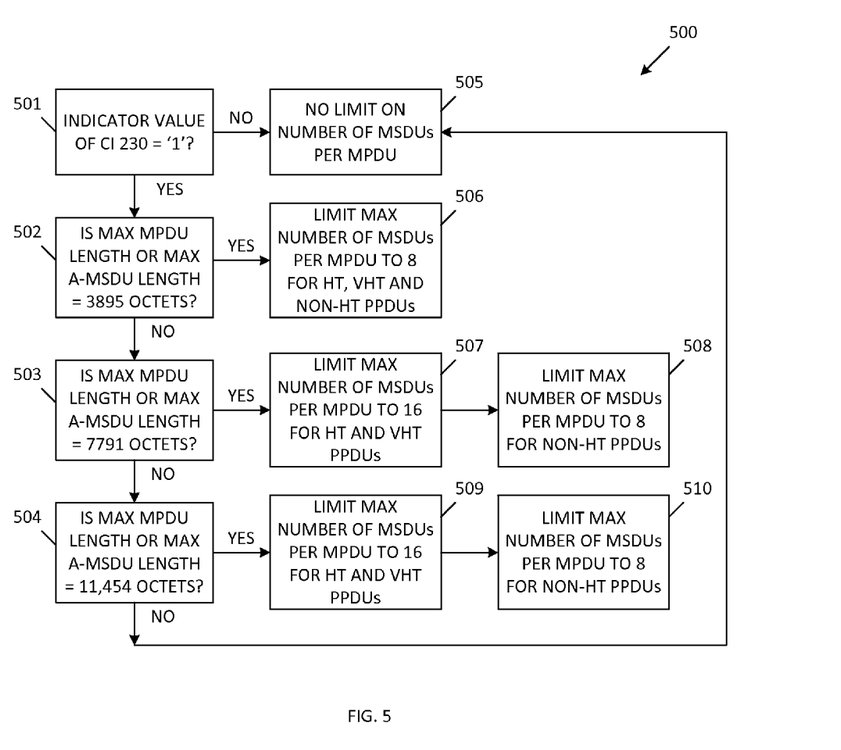
FIG. 5 is a flow diagram that illustrates a manner in which the maximum number of MSDUs per MPDU may be selected in response to a 1-bit capabilities indication, a known maximum MPDU length parameter, and a known maximum A-MSDU length parameter, in accordance with one embodiment.

FIG. 5 is a flow diagram 500 that illustrates the manner in which the maximum number of MSDUs per MPDU (first embodiment) may be selected in response to a 1-bit indictor value of the capabilities indication CI 230 and the known maximum MPDU length parameter and the known maximum A-MSDU length parameter, in accordance with one embodiment of the disclosure.

If the indicator value of the capabilities indication CI 230 has a value of '0' (501, No branch), then the transmitter STA 220 will not impose a numerical limit on the number of MSDUs included in an MPDU (505).

However, if the indicator value of the capabilities indication CI 230 has a value of '1' (501, Yes branch), then the transmitter STA 220 will determine whether the maximum MPDU length parameter or the maximum A-MSDU length parameter has a value of 3895 octets (502). If so (502, Yes branch), then the transmitter STA 220 will include no more than 8 MSDUs in each MPDU (506). This limitation will be followed by the transmitter STA 220 for high-throughput (HT), very high throughput (VHT) and non-HT PPDUs transmitted from the transmitter STA 220 to the receiver STA 210.

If the transmitter STA 220 determines that neither the maximum MPDU length parameter nor the maximum A-MSDU length parameter has a value of 3895 octets (502, No branch), then the transmitter STA 220 will determine whether the maximum MPDU length parameter or the maximum A-MSDU length parameter has a value of 7791 octets (503). If so (503, Yes branch), then the transmitter STA 220 will include no more than 16 MSDUs in each MPDU for each HT and VHT PPDU transmitted to the receiver STA 210 (507). In addition, the transmitter STA 220 will include no more than 8 MSDUs in each MPDU for each non-HT PPDU transmitted to the receiver STA 210 (508).

If the transmitter STA 220 determines that neither the maximum MPDU length parameter nor the maximum A-MSDU length parameter has a value of 7791 octets (503, No branch), then the transmitter STA 220 will determine whether the maximum MPDU length parameter or the maximum A-MSDU length parameter has a value of 11,454 octets (504). If so (504, Yes branch), then the transmitter STA 220 will include no more than 16 MSDUs in each MPDU for each HT and VHT PPDU transmitted to the receiver STA 210 (509). In addition, the transmitter STA 220 will include no more than 8 MSDUs in each MPDU for each non-HT PPDU transmitted to the receiver STA 210 (510).

If the transmitter STA 220 determines that neither the maximum MPDU length parameter nor the maximum A-MSDU length parameter has a value of 11,454 octets (504, No branch), then the transmitter STA 220 will not impose a numerical limit on the number of MSDUs included in an MPDU (505).

In the above described manner, the maximum number of MSDUs included in an MPDU can be increased for HT and VHT PPDUs as the maximum MPDU/A-MSDU length increases. The above-described method also allows the maximum number of MSDUs included in an MPDU to remain at a manageable (low) number for non-HT PPDUs, regardless of the maximum MPDU/A-MSDU length.

Although the method described in connection with FIG. 5 uses specific numbers, it is understood that other numbers can be used in other embodiments. Moreover, although the method described in connection with FIG. 5 uses the maximum MPDU length parameter, the maximum A-MSDU length parameter, and the type of PPDU carrying the MSDUs (HT, VHT, non-HT) to determine the maximum number of MSDUs per MPDU, it is understood that in other embodiments, other combinations of parameters may be used to make this determination. Other known parameters that may be used include (but are not limited to) the maximum size of the A-MPDU (as defined by a 'A-MPDU parameters field' of the HT capabilities element), the physical layer (PHY) transmission rate, and other parameters that describe the transmit and receive operations of the receive STA 210 and the transmit STA 220.

Although the method of FIG. 5 describes limiting the maximum number of MSDUs included in each MPDU, in accordance with the first embodiment described above, it is understood that this method can be easily modified to limit the total number of MSDUs included in an A-MPDU, in accordance with the second embodiment described above.

Moreover, although the method of FIG. 5 implements a 1-bit indicator value of the configuration indication CI 230, it is understood that in other embodiments, an indicator value having a length longer than 1-bit can be used, thereby enabling each of the limits defined by the above-described method to have multiple values, which are selected in response to the indicator value.

The above-described configuration indication CI 230 can be included in various signals transmitted from the receiver STA 210 to the transmitter STA 220 in various embodiments of the disclosure.

Figure 6:
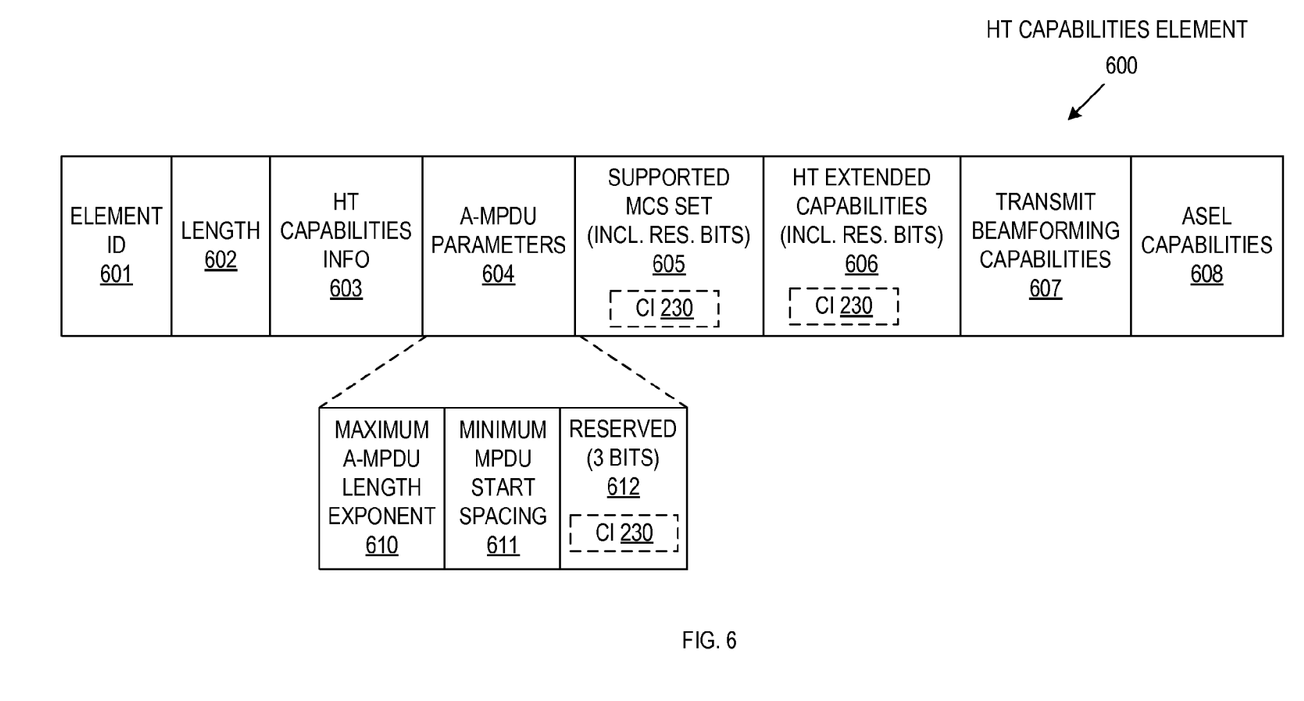
FIG. 6 is a block diagram of an HT capabilities element, which is modified to carry the configuration indication in accordance with various embodiments.

FIG. 6 is a block diagram of an HT capabilities element 600 in accordance with the IEEE 802.11 standard, which can be modified to carry the configuration indication CI 230 in accordance with various embodiments of the disclosure. HT capabilities element 600 includes element ID field 601, length field 602, HT capabilities info field 603 (which specifies the maximum A-MSDU size parameter described above), A-MPDU parameters field 604, supported MCS set field 605, HT extended capabilities field 606, transmit beamforming capabilities field 607 and ASEL capabilities field 608. A-MPDU parameters field 604 includes maximum A-MPDU length exponent field 610 (which specifies the maximum A-MPDU size parameter described above), minimum MPDU start spacing field 611 and reserved field 612, which includes 3 reserved bits.

In accordance with one embodiment, the configuration indication CI 230 is implemented using one or more of the three reserved bits in the reserved field 612. In another embodiment, the configuration indication CI 230 is implemented using one or more of six reserved bits included in the supported MCS set field 605. In yet another embodiment, the configuration indication CI 230 is implemented using one or more of three reserved bits included in the HT extended capabilities field 606.

Figure 7:
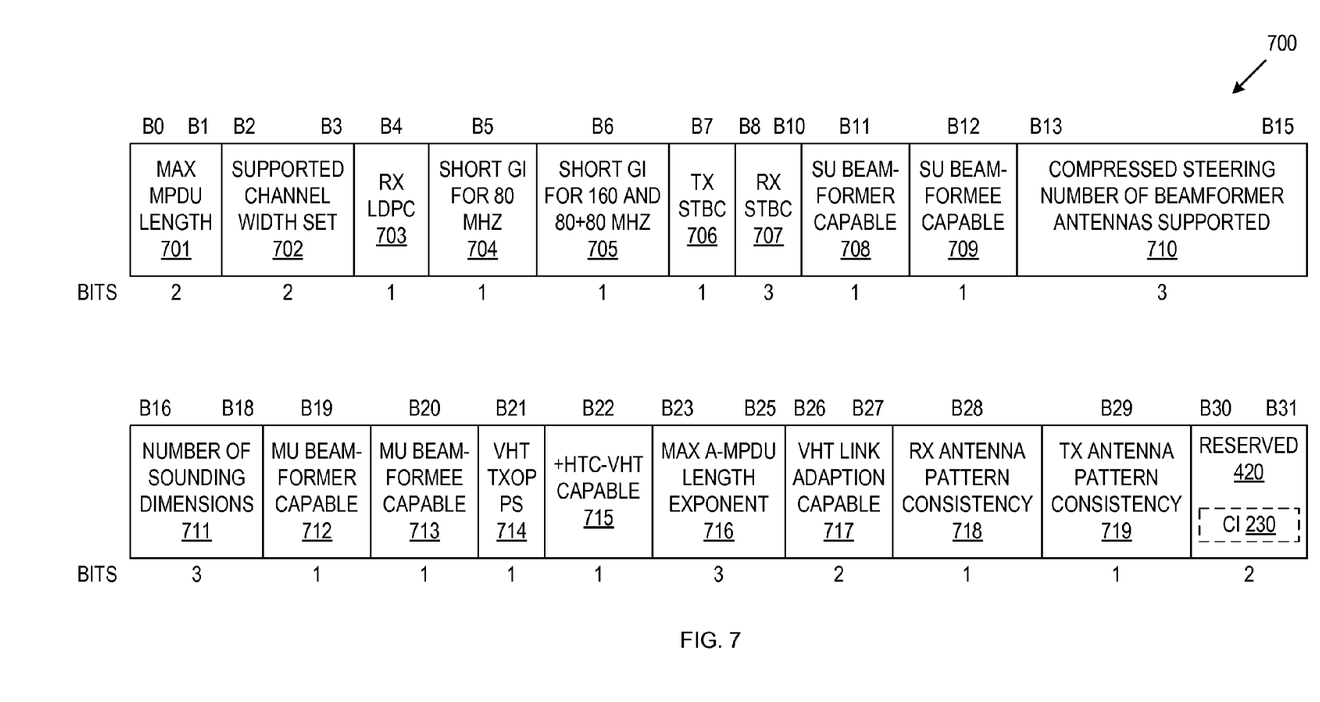
FIG. 7 is a block diagram of a VHT capabilities information field, which is modified to carry the configuration indication in accordance with other embodiments.

FIG. 7 is a block diagram of a VHT capabilities information field 700 in accordance with the IEEE 802.11 standard, which can be modified to carry the configuration indication CI 230 in accordance with other embodiments of the disclosure. VHT capabilities information field 700 includes subfields 701-720, which provide the labeled parameters in a manner understood by those of ordinary skill in the art. Note that subfield 701 defines the maximum MPDU length parameter ($MPDU_{MAX}$) described above. In accordance with one embodiment, the configuration indication CI 230 is implemented using one (or both) of the two reserved bits in the reserved sub-field 720.

Figure 8:
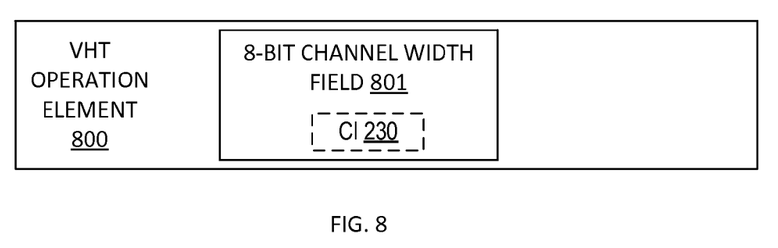
FIG. 8 is a block diagram of a VHT operation element, which is modified to carry the configuration indication in accordance with another embodiment.

FIG. 8 is a block diagram of a VHT operation element 800 in accordance with the IEEE 802.11 standard, which can be modified to carry the configuration indication CI 230 in accordance with another embodiment of the disclosure. VHT operation element 800 includes an 8-bit channel width field 801, wherein the 8-bits of this field 801 are currently used to convey only four values. In the present embodiment, the two bits of the channel width field 801 are used to define the four possible channel width values, and the remaining six bits of the channel width field 801 are used to define the configuration indication CI 230.

Figure 9:
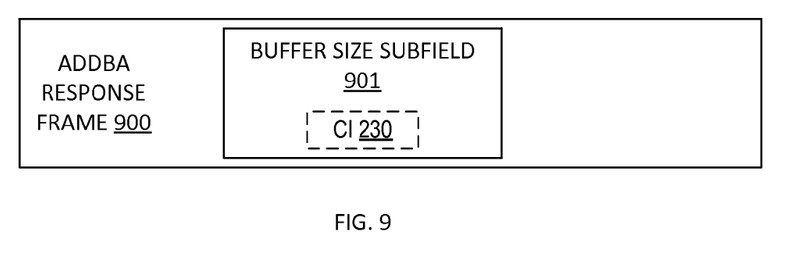
FIG. 9 is a block diagram of an Add Block Acknowledge (ADDBA) response frame, which is which modified to carry the configuration indication in accordance with another embodiment.

FIG. 9 is a block diagram of an Add Block Acknowledge (ADDBA) response frame 900 in accordance with the IEEE 802.11 standard, which can be modified to carry the configuration indication CI 230 in accordance with another embodiment of the disclosure. ADDBA response frame 900 includes a buffer size subfield 901 that includes undefined values (e.g., the buffer size subfield 901 carries values greater than one, but no meaning is associated with those values). In the present embodiment, the undefined values of the buffer size subfield 901 are reused to define the configuration indication CI 230.

Although various manners of transmitting the configuration indication CI 230 have been described, it is understood that the configuration indication CI 230 can be transmitted in other manners (e.g., within other frame types) in other embodiments.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

We claim:

1. A method comprising:
selecting a configuration indication value within a first wireless station, wherein the configuration indication value specifies a maximum number of medium access control layer service data units (MSDUs) allowed in a medium access control layer protocol data unit (MPDU), and wherein a value of the maximum number of MSDUs allowed is determined based at least in part on a number of bits allocated to communicate the configuration indication value; and
transmitting the configuration indication value from the first wireless station to a second wireless station.

2. The method of claim 1, further comprising receiving one or more MPDUs with the first wireless station, wherein each of the one or more MPDUs is transmitted from the second wireless station, and includes no more than the maximum number of MSDUs specified by the configuration indication value.

3. The method of claim 1, wherein transmitting the configuration indication value from the first wireless station to the second wireless station comprises:
including the configuration indication value in a high throughput (HT) capabilities element; and
transmitting the HT capabilities element from the first wireless station to the second wireless station.

4. The method of claim 3, further comprising including the configuration indication value in reserved bits of the HT capabilities element.

5. The method of claim 3, further comprising including the configuration indication value in an Aggregated MPDU (A-MPDU) Parameters Field of the HT capabilities element.

6. The method of claim 3, further comprising including the configuration indication value in a Supported Modulation and Coding Sequence (MCS) Set of the HT capabilities element.

7. The method of claim 3, further comprising including the configuration indication value in a HT Extended Capabilities field of the HT capabilities element.

8. The method of claim 1, wherein transmitting the configuration indication value from the first wireless station to the second wireless station comprises:
including the configuration indication value in a very high throughput (VHT) capabilities information field; and
transmitting the VHT capabilities information field from the first wireless station to the second wireless station.

9. The method of claim 1, wherein transmitting the configuration indication value from the first wireless station to the second wireless station comprises:
including the configuration indication value in a channel width field of a very high throughput (VHT) operation element; and
transmitting the VHT operation element from the first wireless station to the second wireless station.

10. The method of claim 1, wherein transmitting the configuration indication value from the first wireless station to the second wireless station comprises:
including the configuration indication value in a buffer size subfield of an Add Block Acknowledge (ADDBA) response frame; and
transmitting the ADDBA response frame from the first wireless station to the second wireless station.

11. A method comprising:
receiving, by a second wireless station, a configuration indication value transmitted from a first wireless station;
determining a maximum number of medium access control layer service data units (MSDUs) allowed in each medium access control layer protocol data unit (MPDU) transmitted to the first wireless station based at least in part on the configuration indication value and a first parameter defining communications between the first wireless station and the second wireless station; and
transmitting a plurality of MPDUs from the second wireless station to the first wireless station, wherein each of the plurality of MPDUs includes no more than the maximum number of MSDUs specified by the configuration indication value.

12. The method of claim 11, wherein the first parameter defines a maximum allowed length of each MPDU.

13. The method of claim 11, wherein the first parameter defines a maximum allowed length of an aggregated MSDU (A-MSDU).

14. The method of claim 11, further comprising determining the maximum number of MSDUs allowed in each MPDU in response to a type of a frame that is carrying the MSDUs.

15. The method of claim 14, wherein the type of the frame includes a high-throughput (HT) frame, a very high-throughput (VHT) frame, or a non-HT frame.

16. A wireless station comprising:
a control circuit to provide a configuration indication value, wherein the configuration indication value specifies a maximum number of medium access control layer service data units (MSDUs) allowed in each medium access control layer protocol data unit (MPDU) received by the wireless station, and wherein a value of the maximum number of MSDUs allowed is determined based at least in part on a number of bits allocated to communicate the configuration indication value; and
a transmitter to transmit the configuration value from the wireless station.

17. The wireless station of claim 16, further comprising a receiver to receive one or more MPDUs transmitted from an external wireless station, wherein each of the one or more MPDUs transmitted from the external station includes no more than the maximum number of MSDUs specified by the configuration indication value.

18. The wireless station of claim 16, wherein the control circuit to include the configuration indication value in a high throughput (HT) capabilities element, wherein the transmitter to transmit the HT capabilities element from the wireless station.

19. The wireless station of claim 18, wherein the control circuit to include the configuration indication value in reserved bits of the HT capabilities element.

20. The wireless station of claim 18, wherein the control circuit to include the configuration indication value in an Aggregated MPDU (A-MPDU) Parameters Field of the HT capabilities element.

21. The wireless station of claim 18, wherein the control circuit to include the configuration indication value in a Supported Modulation and Coding Sequence (MCS) Set of the HT capabilities element.

22. The wireless station of claim 18, wherein the control circuit to include the configuration indication value in a HT Extended Capabilities field of the HT capabilities element.

23. The wireless station of claim 16, wherein the control circuit to include the configuration indication value in a very high throughput (VHT) capabilities information field, wherein the transmitter to transmit the VHT capabilities information field from the wireless station.

24. The wireless station of claim 16, wherein the control circuit to include the configuration indication value in a channel width field of a very high throughput (VHT) operation element, wherein the transmitter to transmit the VHT operation element from the wireless station.

25. The wireless station of claim 16, wherein the control circuit to include the configuration indication value in a buffer size subfield of an Add Block Acknowledge (ADDBA) response frame, wherein the transmitter to transmit the ADDBA response frame from the wireless station.

26. A wireless station comprising:
a receiver to receive a configuration indication value transmitted from a receiver station;
a control circuit to determine a maximum number of medium access control layer service data units (MSDUs) allowed in each medium access control layer protocol data unit (MPDU) received by the receiver station based at least in part on the configuration indication value and a first parameter defining communications between the wireless station and the receiver station; and
a control circuit to provide a plurality of MPDUs to be transmitted to the receiver station, wherein the control circuit to limit the number of MSDUs in each of the plurality of MPDUs to no more than the maximum number specified by the configuration indication value.

27. The wireless station of claim 26, wherein the first parameter defines a maximum allowed length of each MPDU.

28. The wireless station of claim 26, wherein the first parameter defines a maximum allowed length of an aggregated MSDU (A-MSDU).

29. The wireless station of claim 26, wherein the control circuit to determine the maximum number of MSDUs allowed in each MPDU in response to a type of a frame that is carrying the MSDUs.

30. The wireless station of claim 29, wherein the type of the frame includes a high-throughput (HT) frame, a very high-throughput (VHT) frame, or a non-HT frame.

31. A wireless station comprising:
means for selecting a configuration indication value within the wireless station, wherein the configuration indication value specifies a maximum number of medium access control layer service data units (MSDUs) allowed in each medium access control layer protocol data unit (MPDU) received by the wireless station), and wherein a value of the maximum number of MSDUs allowed is determined based at least in part on a number of bits allocated to communicate the configuration indication value; and
means for transmitting the configuration indication value from the wireless station.

32. The wireless station of claim 31, further comprising means for receiving one or more MPDUs transmitted from an external wireless station, wherein each of the one or more MPDUs transmitted from the external station includes no more than the maximum number of MSDUs specified by the configuration indication value.

33. The wireless station of claim 31, further comprising means for including the configuration indication value in a high throughput (HT) capabilities element.

34. The wireless station of claim 33, further comprising means for including the configuration indication value in reserved bits of the HT capabilities element.

35. The wireless station of claim 33, further comprising means for including the configuration indication value in an Aggregated MPDU (A-MPDU) Parameters Field of the HT capabilities element.

36. The wireless station of claim 33, further comprising means for including the configuration indication value in a Supported Modulation and Coding Sequence (MCS) Set of the HT capabilities element.

37. The wireless station of claim 33, further comprising means for including the configuration indication value in a HT Extended Capabilities field of the HT capabilities element.

38. The wireless station of claim 31, further comprising means for including the configuration indication value in a very high throughput (VHT) capabilities information field.

39. The wireless station of claim 31, further comprising means for including the configuration indication value in a channel width field of a very high throughput (VHT) operation element.

40. The wireless station of claim 31, further comprising means for including the configuration indication value in a buffer size subfield of an Add Block Acknowledge (ADDBA) response frame.

41. A wireless station comprising:
  means for receiving a configuration indication value transmitted from an external wireless station;
  means for determining a maximum number of medium access control layer service data units (MSDUs) allowed in each medium access control layer protocol data unit (MPDU) transmitted to the external wireless station based at least in part on the configuration indication value and a first parameter defining communications between the wireless station and the external wireless station; and
  means for transmitting a plurality of MPDUs from the wireless station to the external wireless station, wherein each of the plurality of MPDUs includes no more than the maximum number of MSDUs specified by the configuration indication value.

42. The wireless station of claim 41, wherein the first parameter defines a maximum allowed length of each MPDU.

43. The wireless station of claim 42, wherein the first parameter defines a maximum allowed length of an aggregated MSDU (A-MSDU).

44. The wireless station of claim 42, further comprising means for determining the maximum number of MSDUs allowed in each MPDU in response to a type of a frame that is carrying the MSDUs.

45. The wireless station of claim 44, wherein the type of the frame includes one of a high-throughput (HT) frame, a very high-throughput (VHT) frame, and a non-HT frame.

46. A method comprising:
  selecting a configuration indication value within a first wireless station, wherein the configuration indication value specifies a maximum number of medium access control layer service data units (MSDUs) allowed in an aggregated medium access control layer protocol data unit (A-MPDU), and wherein a value of the maximum number of MSDUs allowed is determined based at least in part on a number of bits allocated to communicate the configuration indication value; and
  transmitting the configuration value from the first wireless station to a second wireless station.

47. The method of claim 46, further comprising receiving one or more A-MPDUs with the first wireless station, wherein each of the one or more A-MPDUs is transmitted from the second wireless station, and includes no more than the maximum number of MSDUs specified by the configuration indication value.

48. The method of claim 46, wherein transmitting the configuration indication value from the first wireless station to the second wireless station comprises:
  including the configuration indication value in a high throughput (HT) capabilities element; and
  transmitting the HT capabilities element from the first wireless station to the second wireless station.

49. The method of claim 48, further comprising including the configuration indication value in reserved bits of the HT capabilities element.

50. The method of claim 48, further comprising including the configuration indication value in an Aggregated MPDU (A-MPDU) Parameters Field of the HT capabilities element.

51. The method of claim 48, further comprising including the configuration indication value in a Supported Modulation and Coding Sequence (MCS) Set of the HT capabilities element.

52. The method of claim 48, further comprising including the configuration indication value in a HT Extended Capabilities field of the HT capabilities element.

53. The method of claim 46, wherein transmitting the configuration indication value from the first wireless station to the second wireless station comprises:
  including the configuration indication value in a very high throughput (VHT) capabilities information field; and
  transmitting the VHT capabilities information field from the first wireless station to the second wireless station.

54. The method of claim 46, wherein transmitting the configuration indication value from the first wireless station to the second wireless station comprises:
  including the configuration indication value in a channel width field of a very high throughput (VHT) operation element; and
  transmitting the VHT operation element from the first wireless station to the second wireless station.

55. The method of claim 49, wherein transmitting the configuration indication value from the first wireless station to the second wireless station comprises:
  including the configuration indication value in a buffer size subfield of an Add Block Acknowledge (ADDBA) response frame; and
  transmitting the ADDBA response frame from the first wireless station to the second wireless station.

56. A method comprising:
  receiving a configuration indication value transmitted from a first wireless station with a second wireless station;
  determining a maximum number of medium access control layer service data units (MSDUs) allowed in each aggregated medium access control layer protocol data unit (A-MPDU) transmitted to the first wireless station based at least in part on the configuration indication value and a first parameter defining communications between the first wireless station and the second wireless station; and
  transmitting a plurality of A-MPDUs from the second wireless station to the first wireless station, wherein each of the plurality of A-MPDUs includes no more than the maximum number of MSDUs specified by the configuration indication value.

57. The method of claim 56, wherein the first parameter defines a maximum allowed length of each medium access control layer protocol data unit (MPDU) of the A-MPDU.

58. The method of claim 56, wherein the first parameter defines a maximum allowed length of an aggregated MSDU (A-MSDU).

59. The method of claim 56, further comprising determining the maximum number of MSDUs allowed in each A-MPDU in response to a type of a frame that is carrying the MSDUs.

60. The method of claim 59, wherein the type of the frame includes a high-throughput (HT) frame, a very high-throughput (VHT) frame, or a non-HT frame.

61. A wireless station comprising:
  a control circuit to provide a configuration indication value, wherein the configuration indication value specifies a maximum number of medium access control layer service data units (MSDUs) allowed in each aggregated medium access control layer protocol data unit (A-MPDU) received by the wireless station, and wherein a value of the maximum number of MSDUs allowed is determined based at least in part on a number of bits allocated to communicate the configuration indication value; and
  a transmitter to transmit the configuration value from the wireless station.

62. The wireless station of claim 61, further comprising a receiver to receive one or more A-MPDUs transmitted from an external wireless station, wherein each of the one or more A-MPDUs transmitted from the external station includes no more than the maximum number of MSDUs specified by the configuration indication value.

63. The wireless station of claim 61, wherein the control circuit to include the configuration indication value in a high throughput (HT) capabilities element, wherein the transmitter transmits the HT capabilities element from the wireless station.

64. The wireless station of claim 63, wherein the control circuit to include the configuration indication value in reserved bits of the HT capabilities element.

65. The wireless station of claim 63, wherein the control circuit to include the configuration indication value in an Aggregated MPDU (A-MPDU) Parameters Field of the HT capabilities element.

66. The wireless station of claim 63, wherein the control circuit to include the configuration indication value in a Supported Modulation and Coding Sequence (MCS) Set of the HT capabilities element.

67. The wireless station of claim 63, wherein the control circuit to include the configuration indication value in a HT Extended Capabilities field of the HT capabilities element.

68. The wireless station of claim 61, wherein the control circuit to include the configuration indication value in a very high throughput (VHT) capabilities information field, wherein the transmitter to transmit the VHT capabilities information field from the wireless station.

69. The wireless station of claim 61, wherein the control circuit to include the configuration indication value in a channel width field of a very high throughput (VHT) operation element, wherein the transmitter to transmit the VHT operation element from the wireless station.

70. The wireless station of claim 61, wherein the control circuit to include the configuration indication value in a buffer size subfield of an Add Block Acknowledge (ADDBA) response frame, wherein the transmitter to transmit the ADDBA response frame from the wireless station.

71. A wireless station comprising:
a receiver to receive a configuration indication value transmitted from a receiver station;
a control circuit to determine a maximum number of medium access control layer service data units (MSDUs) allowed in each aggregated medium access control layer protocol data unit (A-MPDU) received by the receiver station based at least in part on the configuration indication value and a first parameter defining communications between the wireless station and the receiver station; and
the control circuit to provide a plurality of A-MPDUs to be transmitted to the receiver station, wherein the control circuit to limit the number of MSDUs in each of the plurality of A-MPDUs to no more than the maximum number specified by the configuration indication value.

72. The wireless station of claim 71, wherein the first parameter defines a maximum allowed length of each medium access control layer protocol data unit (MPDU) of the A-MPDU.

73. The wireless station of claim 71, wherein the first parameter defines a maximum allowed length of an aggregated MSDU (A-MSDU).

74. The wireless station of claim 71, wherein the control circuit determines the maximum number of MSDUs allowed in each A-MPDU in response to a type of a frame that is carrying the MSDUs.

75. The wireless station of claim 74, wherein the type of the frame includes a high-throughput (HT) frame, a very high-throughput (VHT) frame, or a non-HT frame.

76. A wireless station comprising:
means for selecting a configuration indication value within the wireless station, wherein the configuration indication value specifies a maximum number of medium access control layer service data units (MSDUs) allowed in each aggregated medium access control layer protocol data unit (A-MPDU) received by the wireless station, and wherein a value of the maximum number of MSDUs allowed is determined based at least in part on a number of bits allocated to communicate the configuration indication value; and
means for transmitting the configuration indication value from the wireless station.

77. The wireless station of claim 76, further comprising means for receiving one or more A-MPDUs transmitted from an external wireless station, wherein each of the one or more A-MPDUs transmitted from the external station includes no more than the maximum number of MSDUs specified by the configuration indication value.

78. The wireless station of claim 76, further comprising means for including the configuration indication value in a high throughput (HT) capabilities element.

79. The wireless station of claim 76, further comprising means for including the configuration indication value in reserved bits of the HT capabilities element.

80. The wireless station of claim 78, further comprising means for including the configuration indication value in an Aggregated MPDU (A-MPDU) Parameters Field of the HT capabilities element.

81. The wireless station of claim 78, further comprising means for including the configuration indication value in a Supported Modulation and Coding Sequence (MCS) Set of the HT capabilities element.

82. The wireless station of claim 78, further comprising means for including the configuration indication value in a HT Extended Capabilities field of the HT capabilities element.

83. The wireless station of claim 76, further comprising means for including the configuration indication value in a very high throughput (VHT) capabilities information field.

84. The wireless station of claim 76, further comprising means for including the configuration indication value in a channel width field of a very high throughput (VHT) operation element.

85. The wireless station of claim 76, further comprising means for including the configuration indication value in a buffer size subfield of an Add Block Acknowledge (ADDBA) response frame.

86. A wireless station comprising:
means for receiving a configuration indication value transmitted from an external wireless station;
means for determining a maximum number of medium access control layer service data units (MSDUs) allowed in each aggregated medium access control layer protocol data unit (A-MPDU) transmitted to the external wireless station based at least in part on the configuration indication value and a first parameter defining communications between the wireless station and the external wireless station; and
means for transmitting a plurality of A-MPDUs from the wireless station to the external wireless station, wherein each of the plurality of A-MPDUs includes no more than the maximum number of MSDUs specified by the configuration indication value.

87. The wireless station of claim 86, wherein the first parameter defines a maximum allowed length of each medium access control layer protocol data unit (MPDU) of the A-MPDU.

88. The wireless station of claim 86, wherein the first parameter defines a maximum allowed length of an aggregated MSDU (A-MSDU).

89. The wireless station of claim 86, further comprising means for determining the maximum number of MSDUs allowed in each A-MPDU in response to a type of a frame that is carrying the MSDUs.

90. The wireless station of claim 89, wherein the type of the frame includes a high-throughput (HT) frame, a very high-throughput (VHT) frame, or a non-HT frame.

91. A method comprising
  selecting a configuration indication value within a first wireless station, wherein the configuration indication value specifies a maximum number of medium access control layer service data units (MSDUs) allowed in a medium access control layer protocol data unit (MPDU);
  including the configuration indication value in in reserved bits of a high throughput (HT) capabilities element; and
  transmitting the configuration indication value from the first wireless station to a second wireless station.

* * * * *